US010562181B2

(12) United States Patent
Hudson et al.

(10) Patent No.: US 10,562,181 B2
(45) Date of Patent: Feb. 18, 2020

(54) DETERMINING AND UTILIZING CORRECTIONS TO ROBOT ACTIONS

(71) Applicant: X Development LLC, Mountain View, CA (US)

(72) Inventors: Nicolas Hudson, San Mateo, CA (US); Devesh Yamparala, Mountain View, CA (US)

(73) Assignee: X Development LLC, Mountain View, CA (US)

( * ) Notice: Subject to any disclaimer, the term of this patent is extended or adjusted under 35 U.S.C. 154(b) by 219 days.

(21) Appl. No.: 15/640,914

(22) Filed: Jul. 3, 2017

(65) Prior Publication Data

US 2019/0001489 A1    Jan. 3, 2019

(51) Int. Cl.
*B25J 13/08* (2006.01)
*B25J 9/16* (2006.01)
*G05B 13/02* (2006.01)

(52) U.S. Cl.
CPC ............... *B25J 9/161* (2013.01); *B25J 9/163* (2013.01); *G05B 13/027* (2013.01)

(58) Field of Classification Search
CPC ...... B25J 11/0005; B25J 9/163; B25J 9/1671; B25J 9/1697; G05B 19/423; G05B 2219/40116; G06K 9/2081; G06K 9/66
USPC .......... 700/245–264; 318/567–569; 901/1–2, 901/46–47; 414/783; 382/155; 706/12
See application file for complete search history.

(56) References Cited

U.S. PATENT DOCUMENTS

| | | | | |
|---|---|---|---|---|
| 2013/0346348 | A1* | 12/2013 | Buehler | B25J 9/0087 706/12 |
| 2014/0371912 | A1* | 12/2014 | Passot | G06N 3/008 700/264 |
| 2015/0336274 | A1 | 11/2015 | Connell, II et al. | |
| 2016/0096270 | A1 | 4/2016 | Ibarz Gabardos et al. | |

(Continued)

OTHER PUBLICATIONS

Wang, Z. et al. "Robot grasp detection using multimodal deep convolutional neural networks." Advances in Mechanical Engineering 8.9 (2016): XP055511783, ISSN:1687-8140, DOI: 101177/1687814016668077; 12 pages.

(Continued)

*Primary Examiner* — Dalena Tran
(74) *Attorney, Agent, or Firm* — Middleton Reutlinger

(57) ABSTRACT

Methods, apparatus, and computer-readable media for determining and utilizing human corrections to robot actions. In some implementations, in response to determining a human correction of a robot action, a correction instance is generated that includes sensor data, captured by one or more sensors of the robot, that is relevant to the corrected action. The correction instance can further include determined incorrect parameter(s) utilized in performing the robot action and/or correction information that is based on the human correction. The correction instance can be utilized to generate training example(s) for training one or model(s), such as neural network model(s), corresponding to those used in determining the incorrect parameter(s). In various implementations, the training is based on correction instances from multiple robots. After a revised version of a model is generated, the revised version can thereafter be utilized by one or more of the multiple robots.

20 Claims, 9 Drawing Sheets

(56) References Cited

U.S. PATENT DOCUMENTS

2016/0279790 A1    9/2016  Meier et al.

OTHER PUBLICATIONS

Jetley, S. et al., "Prototypical Priors: From Improving Classification to Zero-Shot Learning", XP055511790, Retrieved from the Internet: URL:https://arxiv.org/pdf/1512.01192v1.pdf Dec. 3, 2015.
Tan, S., et al. "Using DragPushing to Refine Centroid Text Classifiers"; Proceedings of the 28th Annual International ACM SIGIR Conference on Research and Development in Information Retrieval; Salvador, Brazil; pp. 653-654, XP058100541, DOI: 10.114511076034. 1076174 ISBN: 978-1-59593-034-7 Aug. 15, 2005.
Borodin, Y., et al. "Live and Learn from mistakes: A lightweight system for document classification", Information Processing & Management, vol. 49, No. 1, pp. 83-98, XP055511796, GB ISSN: 0306-4573, DOI: 10.1016/j.ipm.2012.02.001 Jan. 1, 2013.
Amershi, S. et al. "Power to the people: The role of humans in interactive machine learning." AI Magazine 35, No. 4(2014): 105-120.
Argall, B. et al. "A survey of robot learning from demonstration." Robotics and autonomous systems 57, No. 5 (2009): 469-483.
Bekel, H. et al. "Adaptive computer vision: Online learning for object recognition." In DAGM-Symposium, vol. 3175, pp. 447-454. 2004.
Branson, S. et al. "Visual recognition with humans in the loop." Computer Vision—ECCV 2010 (2010): 438-451.
Chao, C. et al. "Transparent active learning for robots." In Human-Robot Interaction (HRI), 2010 5th ACM/IEEE International Conference on, pp. 317-324. IEEE, 2010.
Grizou, J. et al. Robot Learning Simultaneously a task and How to Interpret Human Instructions. Joint IEEE International Conference on Development and Learning an on Epigenetic Robotics (ICDL-EpiRob), Aug. 2013, Osaka, Japan. ; 9 pages.
Matuszek, C. et al. "Learning to parse natural language commands to a robot control system." In Experimental Robotics, pp. 403-415: Springer International Publishing, 2013.
Rouanet, P. et al. The Impact of Human-Robot Interfaces on the Learning of Visual Objects. IEEE Transactions on Robotics, IEEE, 2013, 29 (2), pp. 525-541; 18 pages.
Thomaz, A. et al. "Teachable robots: Understanding human teaching behavior to build more effective robot learners." Artificial Intelligence 172, No. 6-7 (2008): 716-737.
Murakami, T., "Interactive Robot Supporting System for Object Acquisition", SICE Annual Conference 2007, pp. 2309-2314; Jan. 1, 2007.
European Patent Office; International Search Report and Written Opinion of PCT Ser. No. PCT/US2018/040641; 23 pages; dated Jan. 28, 2019.

\* cited by examiner

DETERMINING AND UTILIZING CORRECTIONS TO ROBOT ACTIONS

BACKGROUND

A robot that has been purchased and put into use may be able to perform a variety of actions. However, in some situations the robot may still perform some actions incorrectly and/or be unable to perform some actions. Such occurrences may be due to a variety of factors such as lack of accuracy and/or robustness of model(s) utilized by the robot in performing actions, varied and/or dynamic environments in which the robot operates, etc. Moreover, for many occurrences of incorrect performance of an action, the robot itself may be unable to recognize the incorrect performance. For example, control processes of the robot may deem an action as correctly performed, despite the performance being incorrect in actuality.

SUMMARY

The present disclosure is directed to methods, apparatus, and computer-readable media (transitory and non-transitory) for determining and utilizing human corrections to robot actions. In some implementations, in response to determining a human correction of an action performed by a robot, a correction instance is generated that includes sensor data that is captured by one or more sensors of the robot, and that is relevant to the corrected action. In some of those implementations, the correction instance further includes determined incorrect parameter(s) that were utilized in performing the action and/or correction information that is based on the human correction (and that is indicative of correct parameter(s)). The correction instance can be utilized to generate training example(s) for training of one or more model(s), such as neural network model(s) that correspond to those used in determining the incorrect parameter(s) utilized in performing the action. In various implementations, the training of the model(s) is based on correction instances received from multiple robots. The multiple robots that generate and provide the correction instances can be physically located in disparate geographic locations and/or environments and/or can vary from one another (e.g., vary hardware-wise and/or software-wise).

Once a revised version of a model is generated, through training based on correction instances from multiple robots, the revised version of the model can thereafter be utilized by one or more of the multiple robots. For example, one of the multiple robots may utilize the revised version in lieu of an earlier corresponding version that was utilized when one of the correction instances was generated by that robot. For instance, the revised version can be transmitted to that robot and that robot can replace a prior locally stored version with the revised version. Also, for instance, the revised version can replace a prior version in a "cloud based" system or other remote system utilized by the robot in performing various tasks.

In some implementations, "local performance" of a robot may additionally or alternatively be altered in response to determining a human correction of an action performed by the robot. For example, the human correction can be received during performance of the action, and the robot can alter the action during performance. Also, for example, one or more "downstream" actions can be modified and/or generated in response to determining the human correction. As an additional example, an incorrectly determined parameter can be supplanted with a correct parameter, where the correct parameter is determined based on the human correction. As yet another example, one or more local neural network models and/or other local models utilized by the robot can be directly adapted based on the human correction.

In some implementations, determining a human correction of an action of a robot is based on user interface input received in association with performance of the action (i.e., before, during, or after performance of the action). The user interface input can be received via one or more sensors of the robot (e.g., a microphone of the robot, sensor(s) that can be utilized to determine human touch and/or human manipulation of the robot), and/or via a client device that is separate from, but in communication with, the robot (e.g., spoken or typed user interface input received via a tablet or smartphone).

Determining that user interface input indicates a correction can be based on analysis of the user interface input itself, and optionally based on parameter(s) of the action being performed. For example, it can be based on one or more terms or other cues in the user interface input that indicate a correction (e.g., "no", "stop", "not"). Also, for example, it can additionally or alternatively be based on comparison of parameter(s) determined based on the user interface input to parameter(s) being utilized in performance of the action. For instance, comparison of "hat" and "bowl" to determine a conflict where the user interface input indicates a classification of an object is a "hat", whereas the action is being performed based on an incorrectly determined classification of "bowl" for the object. When the user interface input is natural language input (e.g., spoken or free-form typed input), a natural language processing (NLP) system and/or other components may optionally be utilized in determining that such user interface input is a correction.

As one example of implementations disclosed herein, assume a robot is performing a task of unloading a dishwasher. In doing so, parameters module(s) can apply vision sensor data, from a vision sensor of the robot (e.g., a monocular camera, stereographic camera, laser scanner), to neural network model(s) to determine poses (positions and orientations) and classifications for objects in the dishwasher. The parameters modules and/or the neural network models can be local to the robot, or in remote computing device(s) in network communication with the robot. As the robot is retrieving each object in the dishwasher, the robot can generate user interface output that indicates the determined classification. For example, as the robot is retrieving an object classified as a plate, it can provide audible output (e.g., via a speaker of the robot) of "grabbing the plate to put it away". Further assume that as the robot is retrieving an object classified as a plate, and after providing the audible output of "grabbing the plate to put it away", a user speaks "that's not a plate, it's a bowl".

The spoken output can be received at a microphone of the robot and analyzed (e.g., utilizing output from an NLP system) to determine that it indicates: the "plate" classification is incorrect, and a "bowl" classification is instead the correct classification. In response to determining that the "plate" classification is incorrect, the robot can generate a correction instance and transmit the correction instance to a remote computing device. The correction instance can be generated to include multiple instances of vision sensor data that capture the incorrectly classified object, and that collectively capture the incorrectly classified object from multiple poses of the vision sensor. For example, the multiple instances can include instances from a "log" of recent sensor data. The correction instance can optionally further include: an identifier of the incorrectly classified object (e.g., an identifier assigned to the object during object detection) to enable determination of the object in the vision sensor data; an indication of the incorrectly determined classification ("plate"); and/or an indication of the human indicated correct classification ("bowl").

The remote computing device can utilize the correction instance, as well as correction instances from multiple additional robots, to generate training examples for training of a neural network model that corresponds to that utilized in incorrectly classifying the object (e.g., for further training of another version of the same neural network model). For example, a first training example can include training example input based on a first instance of the vision sensor data of the correction instance, and training example output that indicates the classification is not "plate" and/or that indicates the classification is "bowl". After the training, the revised neural network model (revised based on correction instances based training) can then be provided to replace the neural network model that incorrectly classified the object.

In various implementations, utilizing correction instances to generate training examples as described herein enables generation of so-called "hard negative" training examples. That is, the training examples are hard negatives since they are generated based on correction instances that are the result of an underlying incorrect determination made based on the neural network model corresponding to the one to be trained. In other words, they are based on collected sensor data that was utilized by the robot to perform what it deemed as a correct action, despite the performance being incorrect in actuality In some implementations, "local performance" of the robot may additionally or alternatively be altered in response to determining that the "plate" classification is incorrect and/or in response to determining that the "bowl" classification is correct. As one example, the robot can alter a previously determined location for placing the object (after retrieval from the dishwasher) based on the determination(s). For instance, the robot may have planned to place the object location in a first "plate" location based on the incorrect classification, and may adjust the placement to a distinct second "bowl" location based on determining that the object instead has a "bowl" classification.

Examples of implementations are provided in the preceding paragraphs for purposes of providing an overview of some of those implementations. However, it is understood that various implementations described herein vary in one or more respects from the provided examples.

In some implementations, a method may be provided that includes applying sensor data as input to a current model for a robot. The sensor data is generated based on one or more sensors of the robot. The method further includes: generating output over the current model based on the sensor data; determining, based on the generated output, one or more parameters for a robot action; and receiving, during or after performance of the robot action by the robot based on the one or more parameters, user interface input that corrects the robot action. The method further includes generating a correction instance in response to receiving the user interface input that corrects the robot action, and transmitting the correction instance to one or more remote computing devices via a network interface. The correction instance includes multiple instances of sensor data that are related to the robot action. The method further includes receiving, subsequent to transmitting the correction instance, a revised version of the current model. The received revised version of the current model is trained based on the correction instance and additional correction instances from additional robots. The method further includes, in response to receiving the revised version of the current model, using the revised version of the current model in lieu of the current model in determining additional parameters for an additional robot action of the robot.

This method and other implementations of technology disclosed herein may each optionally include one or more of the following features.

In some implementations, the multiple instances of the sensor data included in the correction instance include multiple instances of vision sensor data, including: a first instance of the vision sensor data that captures the object at a first time from a first pose, and a second instance of the vision sensor data that captures the object at a second time from a second pose. In some versions of those implementations, generating the correction instance includes: determining that the multiple instances of the vision sensor data are related to the robot action based on temporal proximity of the multiple instances to the robot action. In some additional or alternative versions of those implementations, the multiple instances of the vision sensor data are included in the sensor data applied to the current neural network model in determining the one or more parameters for the robot action.

In some implementations, generating the correction instance includes generating the correction instance to further include correction information that is based on the user interface input.

In some implementations, generating the correction instance includes generating the correction instance to further include: an indication of the current model based on the current model being used in determining the one or more parameters for the robot action.

In some implementations, generating the correction instance includes generating the correction instance to further include the one or more parameters for the robot action.

In some implementations, the user interface input is natural language input.

In some implementations, a method may be provided that includes: receiving user interface input during movement of a robot to perform an action directed toward an object; and determining that the user interface input indicates a correction to the action directed toward the object. The method further includes generating a correction instance in response to determining that the user interface input indicates the correction. The generated correction instance includes multiple instances of vision sensor data that each captures the object. The vision sensor data is generated by a vision sensor of the robot. The multiple instance of vision sensor data included in the generated correction instance include a first instance that captures the object at a first time from a first pose, and a second instance that captures the object at a second time from a second pose. The method further includes transmitting the correction instance to one or more remote computing devices via a network interface. The one or more remote computing devices use the correction instance to generate a plurality of training examples for training a model.

This method and other implementations of technology disclosed herein may each optionally include one or more of the following features.

In some implementations, the model is a neural network model and the method further includes receiving, via the network interface, the neural network model after the neural network model is trained based on: the plurality of training examples, and additional training examples from additional correction instances from additional robots.

In some implementations, the correction instance further includes correction information that is based on the user interface input.

In some implementations, the method further includes determining a predicted classification of the object based on a local model that is local to the robot. In some of those implementations, the action performed by the robot is performed based on the predicted classification, and generating the correction instance includes generating the correction instance to further include the predicted classification of the object.

In some implementations, the method further includes generating the plurality of training examples. In some of those implementations, the generating the plurality of training examples includes generating negative training examples that include training example output that indicates the predicted classification is not a correct classification.

In some implementations, the method further includes: receiving initial user interface input; determining that the initial user interface input indicates the object; and generating robot control commands to perform the action directed toward the object in response to determining that the initial user interface input indicates the object. In some of those implementations, the correction instance further includes correction information that is based on the initial user interface input.

In some implementations, the method further includes altering performance of the action directed toward the object in response to determining that the user interface input indicates the correction.

In some implementations, the method further includes, in response to determining that the user interface input indicates the correction: adjusting, based on the user interface input, a locally stored parameter associated with the object.

In some implementations, a method may be provided that includes: determining a classification of an object in an environment of a robot; receiving initial user interface input provided by a user; determining that the initial user interface input conforms to the classification of the object. The method further includes, in response to determining that the initial user interface input conforms to the classification of the object, providing control commands to one or more actuators of the robot to perform an action directed toward the object. The method further includes: receiving additional user interface input during performance of the action directed toward the object; and determining that the additional user interface input indicates a conflicting classification of the object that does not conform to the determined classification of the object. The method further includes: generating a correction instance in response to determining that the additional user interface input indicates a conflicting classification of the object. The method further includes transmitting the correction instance to one or more remote computing devices via a network interface, wherein the one or more remote computing devices use the correction instance to generate at least one training example for training a model.

This method and other implementations of technology disclosed herein may each optionally include one or more of the following features.

In some implementations, the correction instance includes at least one instance of vision sensor data that captures the object. The vision sensor data is generated by a vision sensor of the robot.

In some implementations, the correction instance includes multiple instances of vision sensor data that each captures the object. The vision sensor data is generated by a vision sensor of the robot.

Other implementations may include a non-transitory computer readable storage medium storing instructions executable by a processor to perform a method such as one or more of the methods described above. Yet other implementations may include a system (e.g., a robot and/or one or more other components) including memory and one or more processors operable to execute instructions, stored in the memory, to implement one or more modules or engines that, alone or collectively, perform a method such as one or more of the methods described above.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
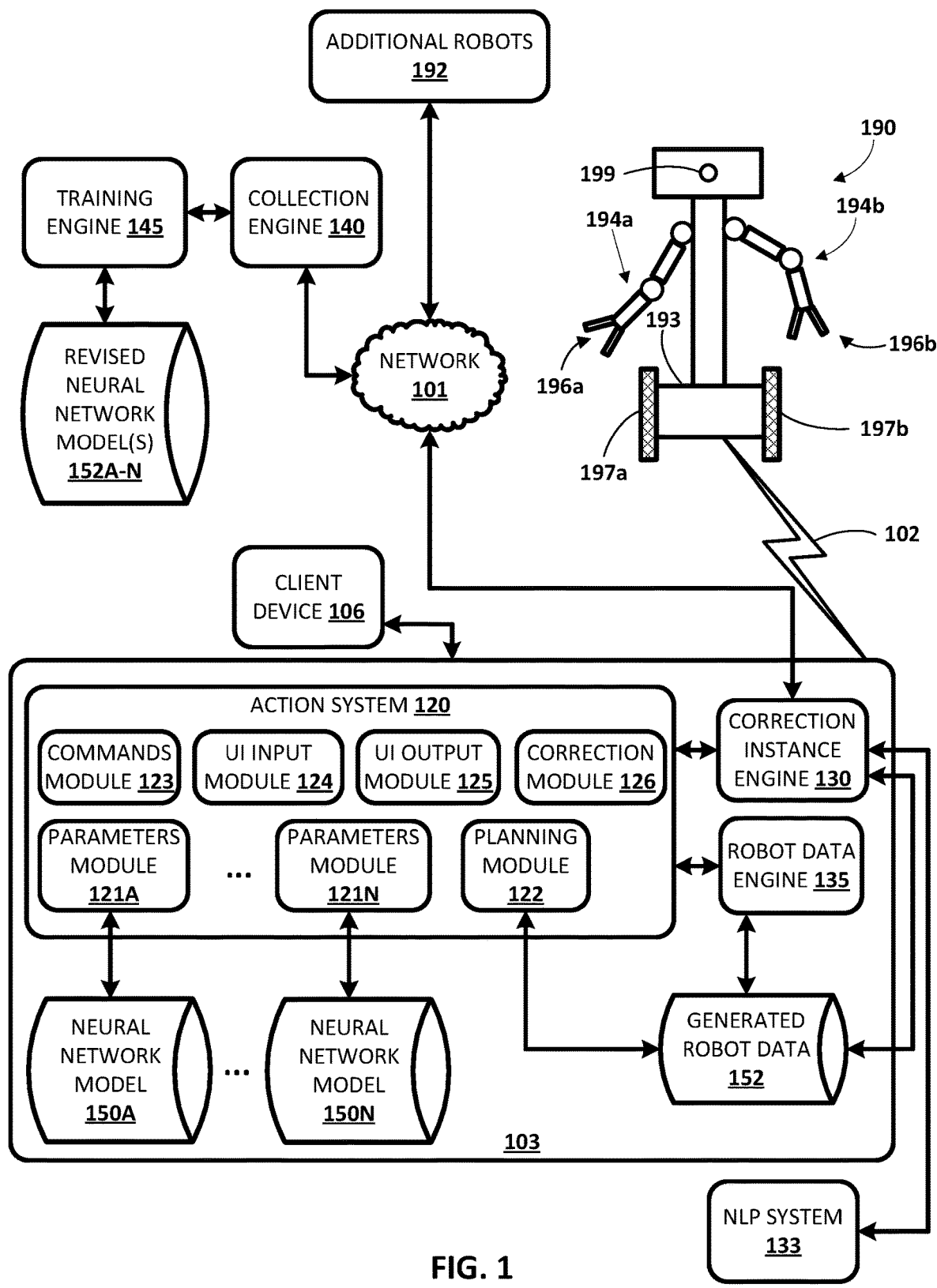
FIG. 1 illustrates an example environment in which implementations disclosed herein may be implemented.

FIG. 1 illustrates an example environment in which implementations disclosed herein may be implemented. The example environment includes a robot 190. Although a particular robot 190 is illustrated in FIG. 1, additional and/or alternative robots may be utilized, including stationary "robot arms", robots having a humanoid form, robots having an animal form, other robots that move via one or more wheels (e.g., other self-balancing robots, non-self-balancing robots), an unmanned aerial vehicle ("UAV"), and so forth.

The robot 190 includes robot arms 194*a* and 194*b* with corresponding grasping end effectors 196*a* and 196*b*, that each take the form of a gripper with two opposing actuable members. The robot 190 also includes a base 193 with wheels 197*a* and 197*b* provided on opposed sides thereof for locomotion of the robot 190. The base 193 may include, for example, one or more motors for driving corresponding wheels 197*a* and 197*b* to achieve a desired direction, velocity, and/or acceleration of movement for the robot 190.

The robot 190 also includes a vision sensor 199. The vision sensor 199 may be, for example, a stereographic camera, a monographic camera, or a 3D laser scanner. In some implementations, a stereographic camera includes two or more sensors (e.g., charge-coupled devices (CCDs)), each at a different vantage point. Based on sensor data generated by the two sensors at a given instance, vision sensor data that is three-dimensional ("3D") point cloud data may be generated for the given instance, where each of the 3D points of the 3D point cloud defines a 3D coordinate of a surface of a corresponding object. In some other implementations, a stereographic camera may include only a single sensor and one or more mirrors utilized to effectively capture sensor data from two different vantage points. A monographic camera can include a single sensor and captures two-dimensional ("2D") vision sensor data. A 3D laser scanner includes one or more lasers that emit light and one or more sensors that generate vision sensor data related to reflections of the emitted light. The generated vision sensor data from a 3D laser scanner may be 3D point cloud data. A 3D laser scanner may be, for example, a time-of-flight 3D laser scanner or a triangulation based 3D laser scanner and may include a position sensitive detector (PSD) or other optical position sensor.

As described herein, robot 190 may operate autonomously at least part of the time and control actuators thereof in performance of various actions. For example, in performing various actions, one or more processors of the robot 190 may provide control commands to actuators associated with the wheels 197a and/or 197b, the robot arms 194a and/or 194b, and/or the end effectors 196a and/or 196b.

Also illustrated in FIG. 1 are various components 103 that are utilized in performance of various actions by the robot 190, in determining human corrections to various actions performed by the robot 190, and/or in generating and transmitting correction instances in response to determining human corrections to those various actions.

Although the components 103 are illustrated separate from the robot 190 in FIG. 1, connection element 102 indicates that those components 103 can be implemented on robot 190 and/or can be in network communication (e.g., via a local area network and/or a wide area network) with robot 190. For example, in some implementations, one or more (e.g., all) of the components 103 are implemented by hardware that is local to the robot 190. For instance, the action system 120, the correction instance engine 130, and/or the robot data engine 135 may be implemented by one or more processors of the robot 190. Also, for instance, neural network model 150A, neural network model 150N, and/or generated robot data database 152 may be stored on one or more hard drives or other computer readable media of the robot 190. As another example, in some implementations one or more of the components 103 are implemented on one or more computing devices that are remote from the robot 190. For example, one or more of the parameters modules 121A-N and/or the neural network models 150A-N may be implemented "in the cloud" by a remote cluster of high performance computing devices and may handle parameter determination for robot 190 and/or other robots (e.g., additional robots 192). As yet another example, one or more of the parameters modules 121A-N and/or the neural network models 150A-N may be implemented by one or more computing devices that are separate from the robot 190, but that are geographically proximal to the robot (e.g., in the same building).

Components 103 include a robot data engine 135 that processes robot sensor data generated by robot sensors of the robot 190 and/or other data generated by components of the robot 190. For example, the robot data engine 135 may receive robot sensor data from various sensors of the robot, timestamp the robot sensor data, and provide the time-stamped robot sensor data to the action system 120. The robot sensor data may include, for example, vision sensor data from vision sensor 199, position sensor data from position sensors of actuators of the robot, accelerometer data from accelerometer(s) of the robot, etc. The robot data engine 135 may further store, in generated robot data database 152, a log of at least some of the robot sensor data. For example, the robot data engine 135 may store a buffer of "recent" sensor data, clearing data from the buffer based on space, temporal, and/or other factors. The robot data engine 135 may further store, in generated robot data database 152, various other data generated by the robot 190 such as parameters and/or other features determined by action system 120, control commands provided to actuators of the robot 190, etc.

The action system 120 uses robot sensor data provided by the robot data engine 135 in performing various robotic actions. The actions may include actions such as picking up an object, "picking and placing" an object, or navigating to a location—and/or relatively more complex collections of actions such as unloading a dishwasher, picking up all "toys" from a defined area, clearing a table of all objects, clearing a table of only certain type(s) of objects, retrieving certain types of objects from multiple rooms of a building, etc. The action system 120 may perform robotic actions in response to various cues. For example, the action system 120 can perform some robotic actions in response to user interface input provided by a human (e.g., perform a task "on demand" in response to spoken input). As other examples, the action system 120 may additionally or alternatively provide some actions based on a schedule (e.g., every weekday morning) and/or based on environmental conditions (e.g., remove items from an area when "messy").

The action system 120 can utilize various modules in performance of actions, examples of which are illustrated in FIG. 1. Parameters modules 121A-N of action system 120 determine various parameters for use by planning module 122 in determining how to execute an action. For example, parameters modules 121A-N can determine parameters that indicate poses and/or classes of objects in the environment of the robot 190, parameters that indicate how to grasp objects in the environment of the robot 190 (e.g., parameters that indicate a grasp pose for grasping end effector 196a and/or 196b), parameters that indicate weights, materials, and/or other physical characteristics of objects in the environment of the robot 190, etc. The planning module 122 can utilize such parameters in determining how to execute an action. For example, in clearing a table, the planning module 122 can use determined object poses and/or classifications to determine objects that are "on the table", and can utilize grasping parameters to determine how to grasp those objects in removing them from the table.

The commands module 123 generates control commands to provide to actuators of the robot 190 to effectuate actions determined by planning module 122. For example, the planning module 122 can be a higher level planner that generates paths and other higher level movements for performing an action, and the commands module 123 can be a real-time module that generates real-time control commands to provide to actuators of the robot 190 to effectuate those higher level movements.

Two parameters modules 121A and 121N are illustrated in FIG. 1 and each utilizes a corresponding neural network model 150A, 150N in generating corresponding parameter(s). It is understood that additional parameters modules may be provided, as indicated by the ellipsis in between parameters modules 121A and 121N. Further, one or more of those additional parameters modules may optionally utilize corresponding neural network model(s), as indicated by the ellipsis between neural network models 150A and 150N. Each of the parameters modules 121A and 121N uses its corresponding neural network model 150A and 150N in generating one or more parameters for utilization by the action system 120.

As one example, parameters module 121A can utilize neural network model 150A to effectively perform object recognition. For instance, the parameters module 121A can apply an instance of vision sensor data (provided by robot data engine 135) as input to neural network model 150A and generate, over the model 150A based on the input, output that indicates pose(s) of one or more objects captured by that instance of vision sensor data. This may be performed iteratively for each of multiple instances of vision sensor data to enable the parameters module 121A to determine poses for each of a plurality of objects in the robots environment—effectively enabling the parameters module 121A to maintain an up to date spatio-temporal "inventory" of objects in the robot's environment.

As another example, parameters module 121N can effectively perform object classification for those objects recognized by parameters module 121A. For example, to determine the classification of an object, the parameters module 121N can apply vision sensor data, and the pose of the object (determined by parameters module 121A) as input to neural network model 150N and generate, over the model 150A based on the input, output that indicates likely classification(s) of the object. This may be performed for each of multiple objects to determine classifications of each of the multiple objects. In some implementations, the parameters module 121N may optionally utilize multiple neural network models, each trained to determine a different group of classifications.

Although particular examples of neural network models and parameters modules are provided in the preceding paragraphs, it is understood that additional and/or alternative neural network models and/or parameters modules may be provided. For example, an additional parameters module may apply vision sensor data and/or other data (e.g., parameter(s) of other parameters module(s)) as input to a corresponding trained neural network model and generate, over the model based on the input, grasping parameters that indicate how to grasp an object captured by the vision sensor data. As another example, a parameters module may perform both object recognition and object classification utilizing a single neural network model.

The action system 120 also includes a UI output module 125. The UI output module 125 can generate user interface output to provide during performance of an action by the robot 190. The provided user interface output is in addition to the movements of the robot 190 in furtherance of performing the action, and provides a perceptible indication of one or more parameters determined by the parameters modules 121A-N. For example, the user interface output can be audible output provided via a speaker of the robot 190, where the audible output "speaks" a determined parameter of an object being acted upon (or to be acted upon) by the robot 190. For instance, when the robot 190 is picking up an object classified by one of the parameters modules 121A-N as a "plate", the robot 190 may generate audible output of "picking up the plate." In other implementations, the UI output module 125 may additionally or alternatively provide visual and/or other non-audible user interface output. Providing user interface output that indicates a determined parameter of an object enables its perception by a human in the environment of the robot 190. Perception of the user interface output enables the human to recognize if it is incorrect and, if so, provide a correction as described herein.

The action system 120 also includes a UI input module 124 that receives user interface input. For example, the UI input module 124 can receive spoken user interface input provided via a microphone of the robot 190, or user interface input provided by a client device 106 that is in communication with the UI input module 124. In some implementations, hardware associated with any microphone of the robot 190 may only be "actively listening" for a human correction in response to certain preceding input, such as a spoken "hot word" (e.g., "hey robot"), a selection of a hardware button (e.g., on the robot), a selection of a virtual button (e.g., rendered on the client device 106), etc.

User interface input provided by the client device 106 is provided in response to user interaction with input device(s) of the client device 106 (e.g., a microphone of the client device 106 and/or a virtual or hardware keyboard), and may optionally be pre-processed by the client device 106 and/or other component (e.g., spoken input pre-processed by converting it to textual input). In some implementations, the UI input module 124 can generate one or more parameters for use by the action system 120 based on the received user interface input. For example, for received user interface input of "clear the table", the UI input module 124 can process the input to determine parameters that indicate actions should be performed, by the robot 190, to remove all objects that are on a "table" object in the environment of the robot 190. Any parameters determined by the UI input module 124 can be provided to the planning module 122. The UI input module 124 can interact with NLP system 133 and/or one or more other components in determining parameters from received user interface input.

The UI input module 124 can additionally or alternatively work in conjunction with the correction instance engine 130. The correction instance engine 130 determines whether received user interface input indicates a correction to a robot action. If so, the correction instance engine 130 generates a corresponding correction instance and transmits the correction instance to collection engine 140 via network 101. In this manner, in various implementations the correction instance engine 130 may transmit correction instances only when received user interface input indicates a correction to the robot action.

The correction instance engine 130 can utilize various techniques in determining that received user interface input indicates a correction to a robot action. In some implementations, where the received user interface input is natural language input (e.g., received via microphone of the robot 190 or received via the client device 106), the correction instance engine 130 can determine it indicates a correction based on semantic and/or other natural language processing of the natural language input. The correction instance engine 130 may optionally interact (e.g., via the Internet or other network(s)) with NLP system 133 or other external resource(s) in processing of natural language input. The NLP system 133 can process natural language input and provide various annotations of the natural language input. For example, the NLP system 133 can provide sentiment annotations (e.g., using a sentiment classifier), entity annotations (that annotate included entities generally and/or specifically), annotations that provide a full semantic interpretation of natural language input, etc.

In some implementations, correction instance engine 130 determines that user interface input indicates a correction to an action based on comparison of the input to a parameter used by the action system 120 in performance of the action.

For example, assume that natural language input of "that's a bowl" is received while the robot 190 is interacting with an environmental object that the parameters module 121N has determined is a "cup". The correction instance engine 130 may determine that the user interface input indicates a correction to the action based on the conflict between the "bowl" classification indicated by the natural language input and the "cup" classification determined by the parameters module 121N. As described herein, in some implementations the UI output module 125 may provide audible or other user interface output during interaction with the environmental object, which may prompt a human to provide the user interface input of "that's a bowl".

In some implementations, correction instance engine 130 determines a correction to an action of the robot based on use interface input that is not natural language user interface input. For example, the user interface input can be based on the user actuating an "error" button on the robot 190, the user "grabbing" the robot 190 (e.g., as sensed based on "exterior" touch-sensitive sensors and/or force-torque or other "internal" sensor(s)), the user interacting with a graphical user interface via the client device 106 (e.g., an interface that enables the user to monitor the status of the robot 190 and report errors generally and/or specifically).

The correction instance generated by correction instance engine 130 in response to determining a correction can include sensor data that is captured by one or more sensors of the robot, and that is relevant to the corrected action. For example, the correction instance can include vision sensor data, robot position sensor data, and/or other data from at and/or before the occurrence of the correction occurring (e.g., data from the last X seconds). Also, for example, the correction instance engine 130 can include instances of vision sensor data in a correction instance based on determining those instances capture object(s) that are the focus of the incorrect action. In some implementations, the correction instance further includes determined parameter(s) utilized in performing the action, indications of neural network model(s) utilized that resulted in the incorrect action, correction information that is based on the human correction, etc.

In some implementations, the correction instance engine 130 additionally or alternatively interacts with the correction module 126 of action system 120 to alter "local performance" of the robot 190 in response to determining a human correction of an action performed by the robot 190. For example, the correction module 126 can alter incorrectly determined parameters based on the human correction, and provide the altered parameters to the planning module 122 for altering of subsequent actions by the planning module 122. For example, where the parameters indicate a given object as a "bowl", but the user interface input indicates the given object is actually a "hat", the correction module 126 can supplant the "bowl" classification for that object with the "hat" classification, and provide the hat classification to planning module 122. Planning module 122 may alter the current action(s) being performed based on the altered classification and/or utilize the altered classification in downstream action(s) (e.g., enabling the planning module to be able to correctly respond to a "bring me my hat" command).

The collection engine 140 receives correction instances from correction instance engine 130 via network 101 (e.g., the Internet). The collection engine 140 may also receive correction instances from additional robots 192 via the network 101. The additional robots 192 can be in various geographic locations and the additional robots 192 may optionally vary from the robot 190 (e.g., they may be different "types", such as a type with four wheels). The correction instances provided by the additional robots 192 can include those that are also generated in response to a human correction of a robot action. The collection engine 140 can be implemented by, for example, a cluster of computing devices.

The collection engine 140 utilizes the correction instances to generate training examples for training of neural network models that correspond to the correction instances. As one example, assume a correction instance is received that includes multiple instances of vision sensor data that capture a particular object, an indication that the particular object was incorrectly classified as a "bowl", and an indication that the classification was corrected to "hat" (via a human correction). In such an example, the collection engine 140 can generate training examples that each include: training example input that is based on a corresponding instance of the vision sensor data; and training example output that indicates "bowl" is not a correct classification and/or that "hat" is a correct classification.

The collection engine 140 provides generated training examples to training engine 145. The training engine 145 utilizes the training examples to train one or more corresponding neural network models to generate corresponding revised neural network models 151A-N. As one example, assume the collection engine 140 provides a large number of training examples generated based on human corrections to incorrect classifications of objects by one or more instances of neural network model 150N. In such an example, the training engine 145 may further train the neural network model 150N (or another model similar to neural network model 150N) to generate revised neural network model 151N. For example, the training engine 145 can apply training example input of a training example to the neural network model 150N, determine an error based on the training example output and actual output generated based on the application of the training example input, and backpropagate the error through the neural network model 150N to update the neural network model 150N. Batch training may optionally be utilized.

Through application of a large quantity of training examples, the training engine 145 generates a revised neural network model 151N. The revised neural network model 151N can then be provided for utilization in lieu of the neural network model 150N. Additionally, such revised neural network model 151N can further be revised in the future, based on subsequently generated training examples, to generate a further revised version of the revised neural network model 151N that can then be provided for utilization in lieu of the initial revised neural network model 151N. In this manner, improved neural network models may be iteratively trained and provided, using training examples that are based on correction instances from robots 190 and 192 that are in diverse environments. Accordingly, over time the neural network models utilized by the robots 190 and 192 will be iteratively updated, each time being further trained based on training examples generated from diverse correction instances. The training engine 145 can be implemented by, for example, a cluster of computing devices.

With reference now to FIGS. 2A-8, additional description of various components of the example environment of FIG. 1 are provided.

Figure 2A:
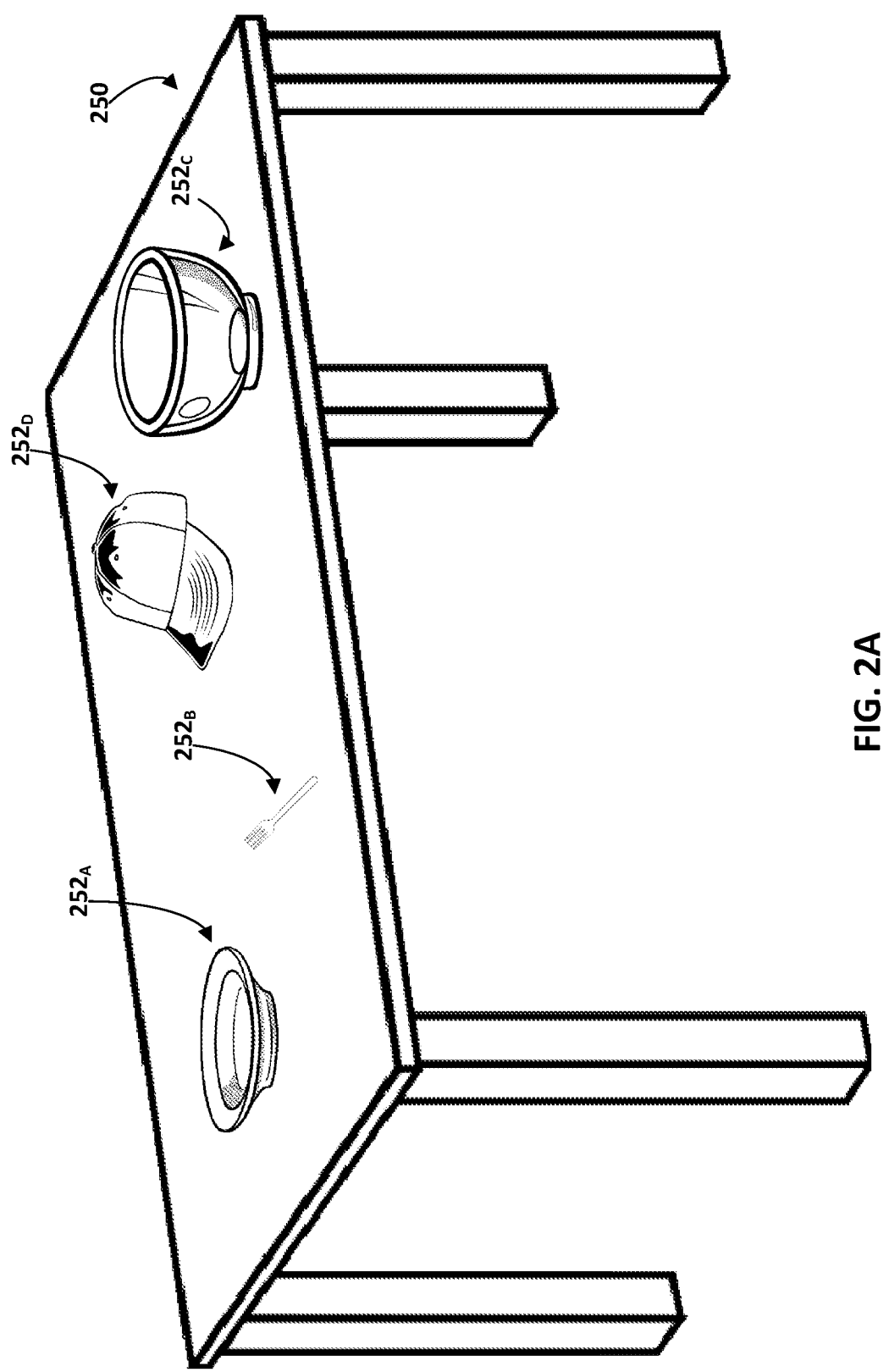
FIGS. 2A, 2B, and 2C illustrate examples of providing corrections to robot actions.
Figure 2B:
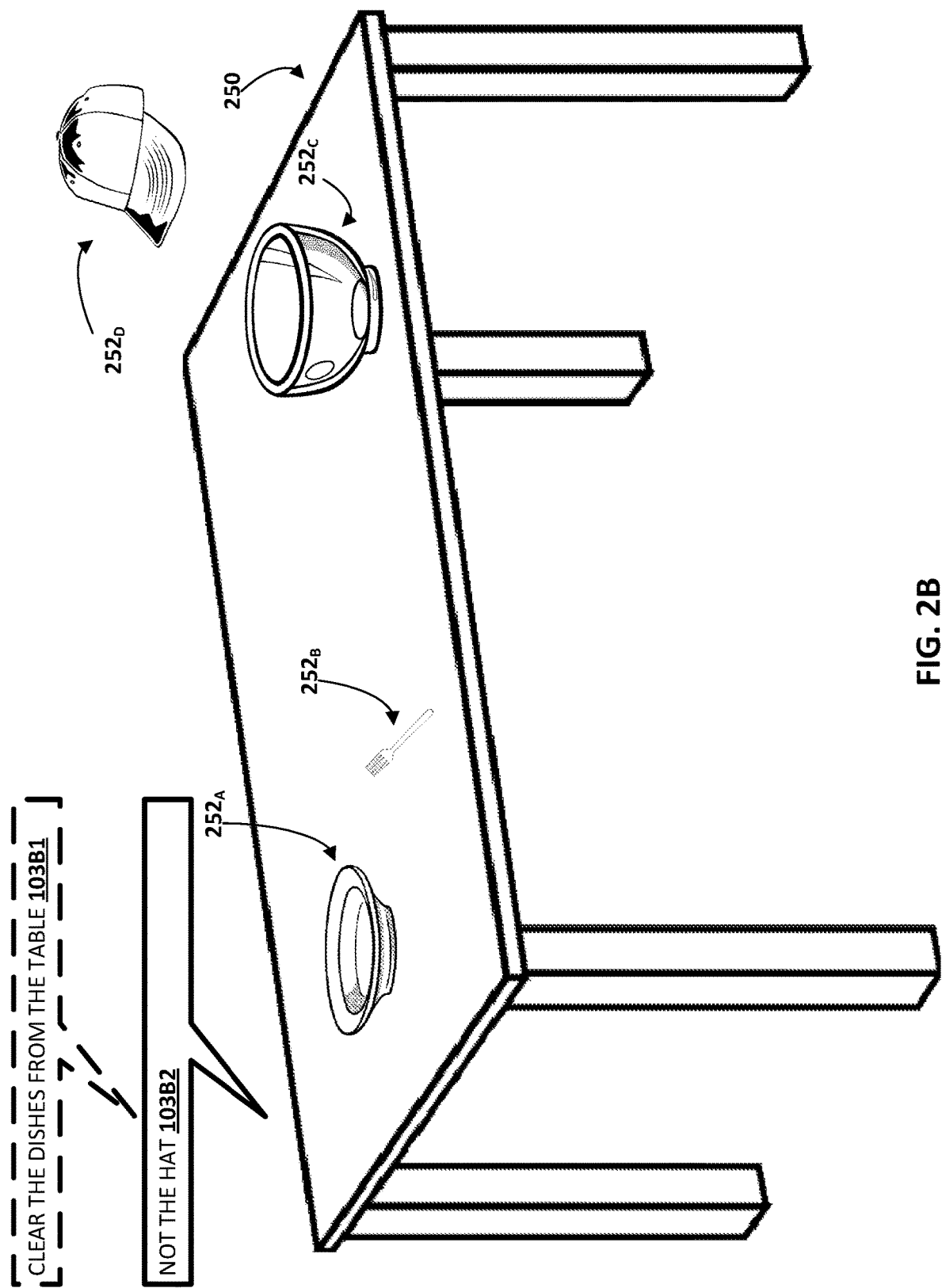
Figure 2C:
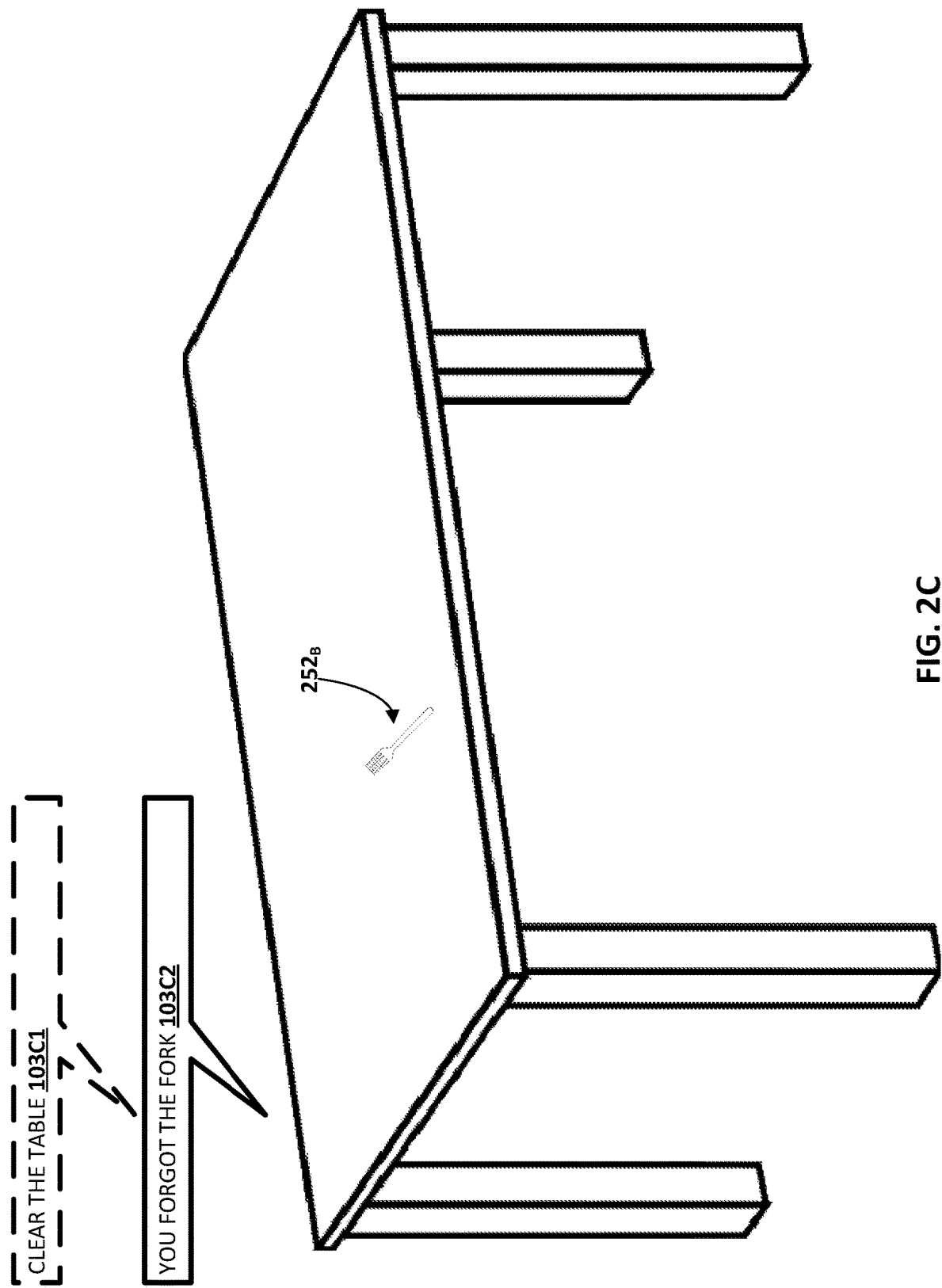

Turning initially to FIGS. 2A-2C, some examples of providing corrections to robot actions are provided. FIGS. 2A-2C depict various states of an example environment in which the robot 190 and/or other robot(s) may operate. FIG.

2A illustrates a table 250 at a first time. At the first time, four objects 252$_{A-D}$ are placed on top of the table 250.

FIG. 2B illustrates an example where, at the first time of FIG. 2A, a user has provided user interface input 103B1 of "clear the dishes from the table". In response, the robot 190 (not depicted in FIG. 2B) may begin removing, from the table 250, objects that it has classified as "dishes". For example, it can begin removing any object classified as a "dish" by the parameters module 121N (based on output generated over neural network model 150N). For instance, FIG. 2B illustrates the environment when the robot 190 is grasping and removing object 252$_D$ from the table, which it has incorrectly classified as a "dish". While the robot 190 is interacting with the object 252$_D$, the user provides further user interface input 103B2 of "not the hat".

The correction instance engine 130 can determine the further user interface input 103B2 indicates a correction to the action being performed on the object 252$_D$. For example, the correction instance engine 130 can determine that the "hat" classification indicated by the user interface input 103B2 conflicts with the incorrectly determined "dish" classification. In response, the correction instance engine 130 can generate a correction instance that includes multiple instances of vision sensor data that capture the object 252$_D$. For example, the action system 120 may "track" the object 252$_D$ in various vision sensor data instances based on a unique identifier, and utilize the unique identifier to determine multiple instances of vision sensor data for inclusion in the correction instance. For instance, instances of vision sensor data may be indexed by unique identifier(s) of objects included in those instances, and the unique identifier of the "hat" utilized to identify those instances indexed with such unique identifier. The correction instance can optionally additionally include other sensor data, an indication of the incorrectly determined classification, an indication of the correct classification, and/or an indication of the neural network model(s) of the robot utilized to determine the incorrect classification.

FIG. 2C illustrates an example where, at the first time of FIG. 2A, a user has provided user interface input 103C1 of "clear the table" (instead of providing the user interface input 103B1 of FIG. 2B). In response, the robot 190 (not depicted in FIG. 2B) can remove, from the table 250, all objects that is has identified. For example, it can remove any detected object based on its pose determined by the parameters module 121A (based on output generated over neural network model 150A).

FIG. 2C illustrates the environment when the robot 190 has completed removing all objects that it has identified. However, the object 252$_B$ remains on the table 250 due to it not being recognized, by the robot 190, as an object that is separate from the table 250. The user provides further user interface input 103C2 of "you forgot the fork". In some situations, the user may provide the further user interface input 103C2 in response to audible user interface output (e.g., "I'm done", a "chime") provided by the robot 190 to indicate it has completed removing all objects that it has identified.

The correction instance engine 130 can determine the further user interface input 103C2 indicates a correction to the action being performed. For example, the correction instance engine 130 can determine that the user interface input 103C2 indicates that an object present on the table 250 was not recognized. In response, the correction instance engine 130 can generate a correction instance that includes multiple instances of vision sensor data that capture the table 250. In some implementations, the user may be prompted (e.g., via a speaker of the robot 190 and/or via the client device 106) to provide further user interface input that indicates where the non-recognized object is located. For example, the user may be presented with an image of the table 250 (an instance of captured vision sensor data) via client device 106 and prompted to identify the object via client device 106 (e.g., "tap" on it, draw a bounding box around it, etc.). Also, for example, the user may be prompted to approach and "point" to the non-recognized object, and the vision sensor 199 can capture vision sensor data instances of the user "pointing" at the object. Such further user interface input may also be provided in the correction instance, optionally along with other sensor data, an indication of the neural network model(s) of the robot that failed to recognize the object, and/or other data.

Figure 3:
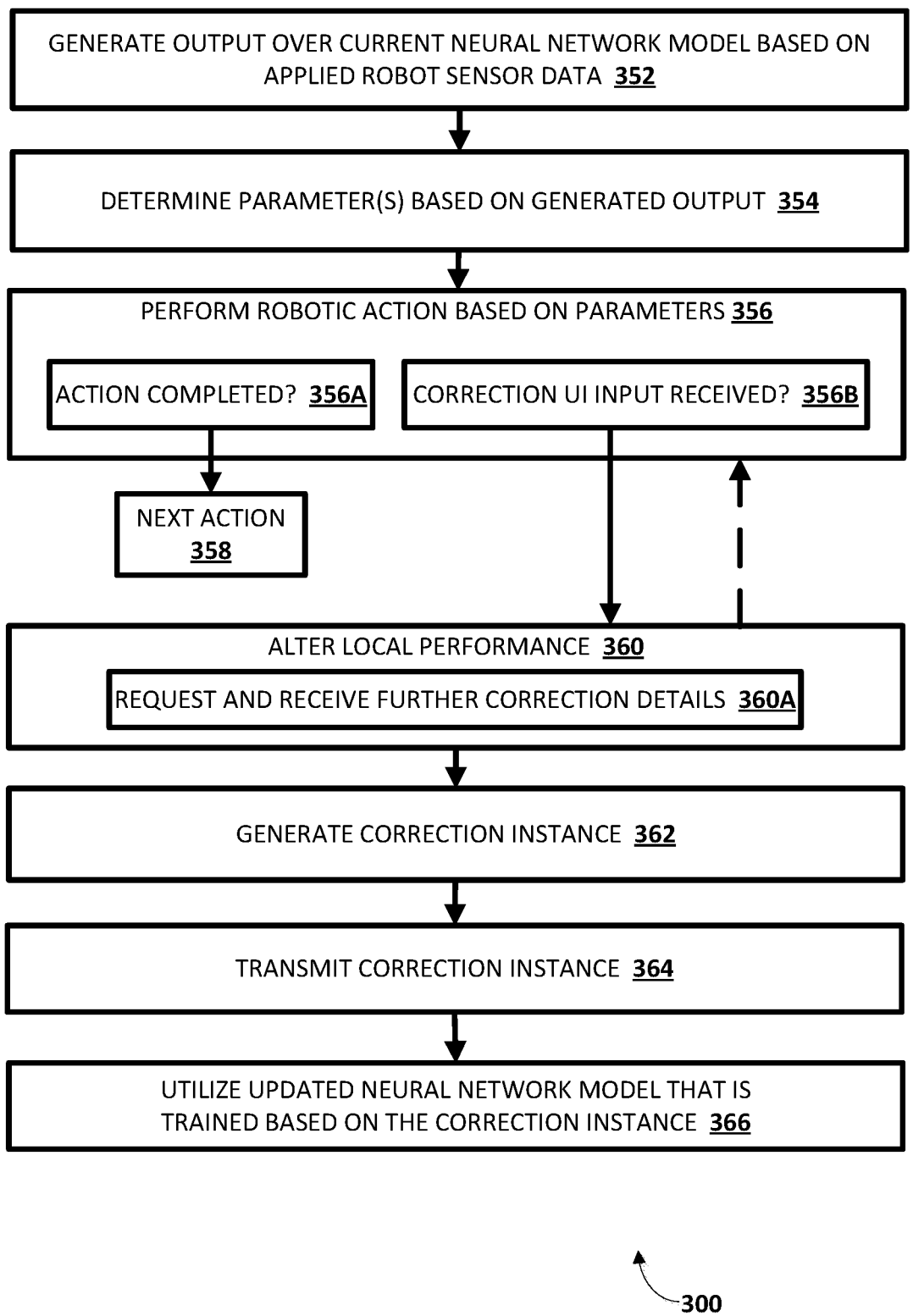
FIG. 3 is a flowchart illustrating an example method according to implementations disclosed herein.

Referring now to FIG. 3, an example method 300 according to various implementations is described. For convenience, the operations of the flowchart are described with reference to a system that performs the operations. This system may include various components of a robot and/or of one or more computing devices in communication with the robot. Moreover, while operations of method 300 are shown in a particular order, this is not meant to be limiting. One or more operations may be reordered, omitted or added.

At block 352, the system generates output over a current neural network model based on applied robot sensor data. As a working example, the system can apply vision sensor data and/or other robot sensor data to a current neural network model trained to predict grasping parameters for grasping an object. The system can further generate output over the model that indicates the grasping parameters based on the applied data. For instance, the output can indicate an end effector pose for grasping of the object.

At block 354, the system determines parameter(s) based on the generated output of block 352. Continuing with the working example, the system can determine the end effector pose for grasping the object based on the output generated at block 352. It is noted that in various implementations the system can determine parameter(s) at block 354 based on multiple instances of output generated based on multiple instance of block 352, with each instance of block 352 applying a different instance of sensor data. Also, it is noted that in various implementations the system can determine parameter(s) at block 354 based on parameter(s) determined based on additional output generated over other neural network model(s) that are in addition to that of block 352.

At block 356, the system performs a robotic action based on the parameter(s) generated at block 354. Continuing with the working example, the system can perform all or part of grasping of the object, with the determined grasping parameters.

Block 356 includes sub-blocks 356A and 356B. At block 356A the system monitors for completion of the action. If the system determines the action is completed, the system proceeds to block 358 and begins performance of a next action.

At block 356B, the system monitors for receipt of correction user interface input. The system can monitor for the receipt of correction user interface input before, during, or after (e.g., for at least a threshold duration after) the performance of the action. If correction UI input is received, the system proceeds to block 360.

Continuing with the working example, assume the system has grasped the object and, while still grasping the object, user interface input of "not like that" is received. In such an example, the system can determine "not like that" is correction user interface input, and proceed to block 360. It is noted that in many scenarios, the system receives correction UI input at block 356B even though the performance of the action, from the system's perspective, is correct. In other words, absent the correction user interface input, the system would not self-recognize the incorrect nature of the performance of the action.

At block 360, the system alters local performance based on the receipt of the correction user interface input. For example, the system can alter the local performance based on determining that the user interface input is correction input and/or based on one or more correction details of the correction input (e.g., correction details of the input and/or further correction details of sub-block 360A). Continuing with the working example, the system may "place" the object in its original position and cease the grasp.

In some implementations, block 360 includes sub-block 360A, in which the system requests and receives further correction details. Continuing with the working example, the system may provide user interface output of "can you show me the right way to pick it up?". In response, the user can kinesthetically teach the correct grasp by physically manipulating the robot. For instance, the system may cause the robot to be in a low mechanical impedance, "gravity-compensated" mode, during which the user can physically manipulate the robot to demonstrate the correct grasp. In such an instance, the system can record sensor data to determine the correct grasping parameters for the object, and utilize those correct grasping parameters for the current action and/or for future actions where the object is grasped. Moreover, the correct grasping parameters may additionally or alternatively be included in a generated correction instance at block 362.

At block 362, the system generates a correction instance. The correction instance can include vision sensor data and/or other sensor data that is relevant to the correction. For example, the system can include vision sensor data based on it being within a threshold temporal proximity of the correction, based on it capturing object(s) that are the focus of the action, etc. In some implementations, the system also optionally includes in the correction instance: the parameter(s) determined at block 354, correction information that is based on the correction user interface input received at block 356B and/or the further correction details received at block 360A, and/or other data.

Continuing with the working example, the system can provide a correction instance that includes multiple instances of vision sensor data that collectively capture the object at multiple poses, and that includes the incorrect grasping parameters and/or the human demonstrated grasping parameters (if any determined at block 360A).

At block 364, the system transmits the correction instance generated at block 362. For example, the system can transmit the correction instance to a remote computing device via one or more networks.

At block 366, the system utilizes an updated neural network model that is trained based on the correction instance. For example, in determining parameters for future tasks, the system can utilize the update neural network model in lieu of the neural network model utilized in block 352. In some implementations, the updated neural network model is trained based on training example(s) generated based on the correction instance and based on other training examples generated based on other correction instances from a plurality of additional robots. It is understood that in many implementations there will be a time delay (e.g., hours, days, weeks) between block 364 and block 366. In the interim, the system may continue to utilize the "prior" neural network model in performing other actions.

Continuing with the working example, the correction instance transmitted at block 364 can be utilized to generate training examples that each include training example input that is based on a corresponding instance of vision sensor data of the correction instance, and training example output that is based on the human demonstrated grasping parameters and/or the incorrect grasping parameters.

Figure 4:
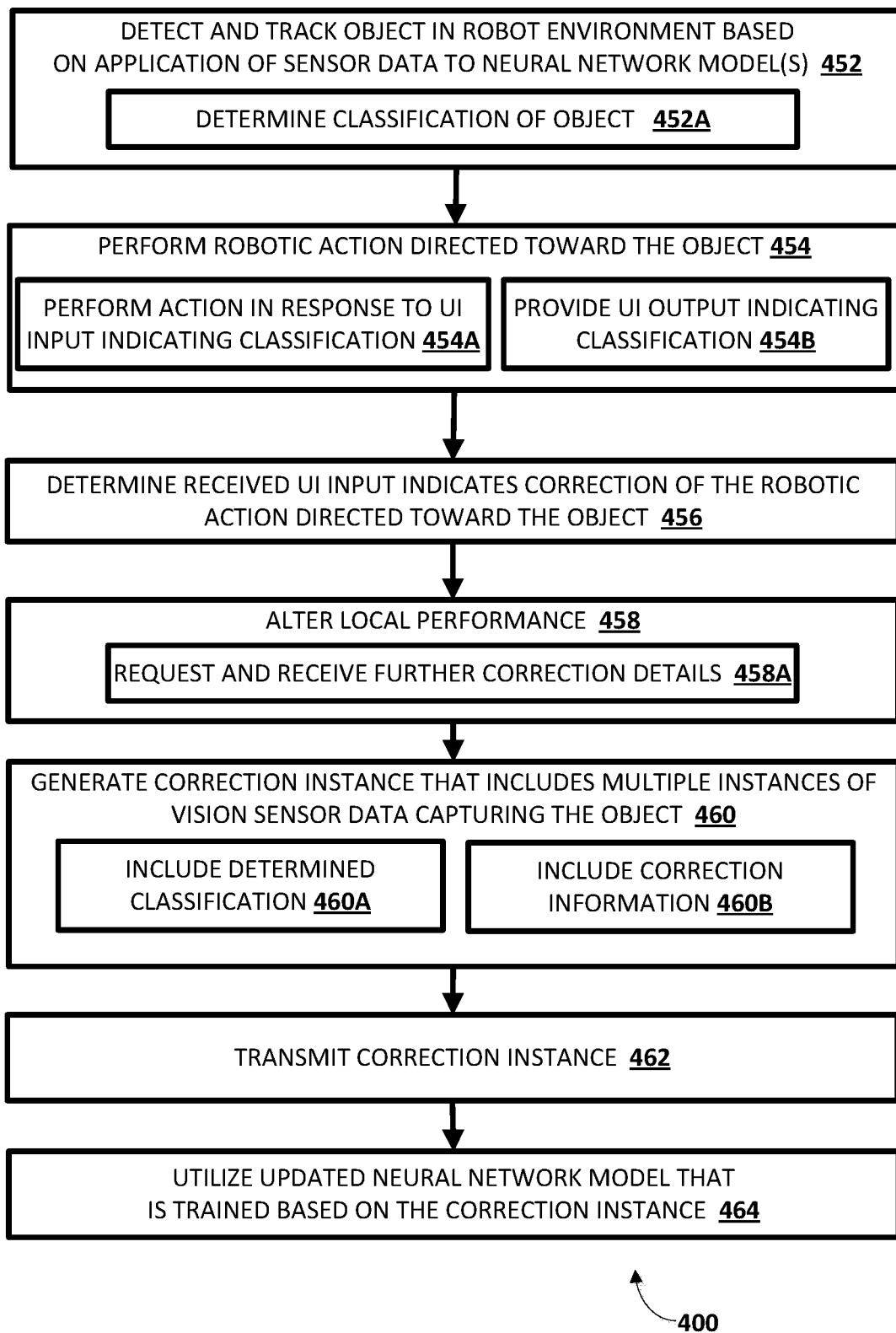
FIG. 4 is a flowchart illustrating another example method according to implementations disclosed herein.

Referring now to FIG. 4, another example method 400 according to various implementations is described. It is noted that method 400 illustrates a particular implementation of the method 300 of FIG. 3.

For convenience, the operations of the flowchart of FIG. 4 are described with reference to a system that performs the operations. This system may include various components of a robot and/or of one or more computing devices in communication with the robot. Moreover, while operations of method 400 are shown in a particular order, this is not meant to be limiting. One or more operations may be reordered, omitted or added.

At block 452, the system detects and tracks an object in a robot environment based on application of sensor data to one or more neural network models. For example, the system can iteratively determine poses (and corresponding timestamps) for the object based on application of instances of vision sensor data, that capture the object, to one or more neural network models.

Block 452 optionally includes block 452A, in which the system further determines a classification of the object based on the one or more neural network models and/or additional neural network models.

At block 454, the system performs a robotic action directed toward the object. For example, the system can move one or more of components of a robot closer toward and/or in contact with the object in grasping or otherwise contacting the object, in getting a better view of the object, etc.

Block 454 optionally includes blocks 454A and/or 454B.

At block 454A, the system performs the robotic action in response to user interface input indicating a classification of the object. For example, the system can perform the action directed toward the object based on received user interface indicating a classification for the object determined at block 452A. As a working example, in response to user interface input of "find the remote control", the system can perform an action directed toward an object it has determined has a "remote control" classification.

At block 454B, the system provides user interface output indicating the classification for the object determined at block 454B. For example, before and/or during performance of the robotic action, the system can provide audio output of "picking up the remote control".

At block 456, the system determines that received user interface input indicates correction of the robotic action directed towards the object. Continuing with the working example, in performing a robotic action of picking up what the system has deemed a "remote control", the system can receive user interface input of "not the phone". The system determine the received user interface input indicates a correction based on the presence of "not" and/or based on determining a conflict between "phone" and "remote control".

At block 458, the system alters local performance based on the receipt of the correction user interface input. For example, the system can alter the local performance based on determining that the user interface input is correction input and/or based on one or more correction details of the correction input (e.g., correction details of the input and/or further correction details of sub-block 458A). Continuing with the working example, the system may "place" the object in its original position and cease the grasp. As another example, and continuing with the working example, the system may change the classification of the object from "remote control" to "phone", and utilize the changed classification in one or more downstream actions (e.g., enabling it to immediately correctly respond to a "pick up the phone" request).

In some implementations, block 458 includes sub-block 458A, in which the system requests and receives further correction details. For example, if the received user interface input of block 456 was "no, not that" (and didn't identify "the phone"), the system may provide user interface output of "can you tell me what I incorrectly picked up?". In response, the user can provide further spoken input of "the phone". In such an example, the system can alter the classification for the object from "remote control" to "phone", and utilize the correct "phone" classification for the current action and/or for future actions. Moreover, the correct "phone" classification may additionally or alternatively be included in a generated correction instance at block 460.

At block 460, the system generates a correction instance that includes multiple instances of vision sensor data capturing the object. For example, the system can include vision sensor data based on it being previously utilized at block 452 to detect the object and/or determine the classification of the object. Also, for example, the system can include a vision sensor data instance based on it capturing an area of the environment at a time during which a spatio-temporal model indicates the object was present in that area.

In some implementations, block 460 includes sub-blocks 460A and/or 460B. At block 460A, the system includes a determined classification of the object in the correction instance. That is, the determined classification that was incorrectly determined at block 452A. At block 460B, the system includes correction information in the correction instance. The correction information can include, for example, an indication of a human provided classification provided at block 454B or block 458A. Additional and/or alternative data may optionally be included by the system in the correction instance.

At block 462, the system transmits the correction instance generated at block 460. For example, the system can transmit the correction instance to a remote computing device via one or more networks.

At block 464, the system utilizes an updated neural network model that is trained based on the correction instance. For example, in determining parameters for future tasks, the system can utilize the update neural network model in lieu of the neural network model(s) utilized in block 452 and/or block 452A. In some implementations, the updated neural network model is trained based on training example(s) generated based on the correction instance and based on other training examples from other correction instances from a plurality of additional robots. It is understood that in many implementations there will be a time delay (e.g., hours, days, weeks) between block 462 and block 464. In the interim, the system may continue to utilize the "prior" neural network model in performing other actions.

Figure 5:
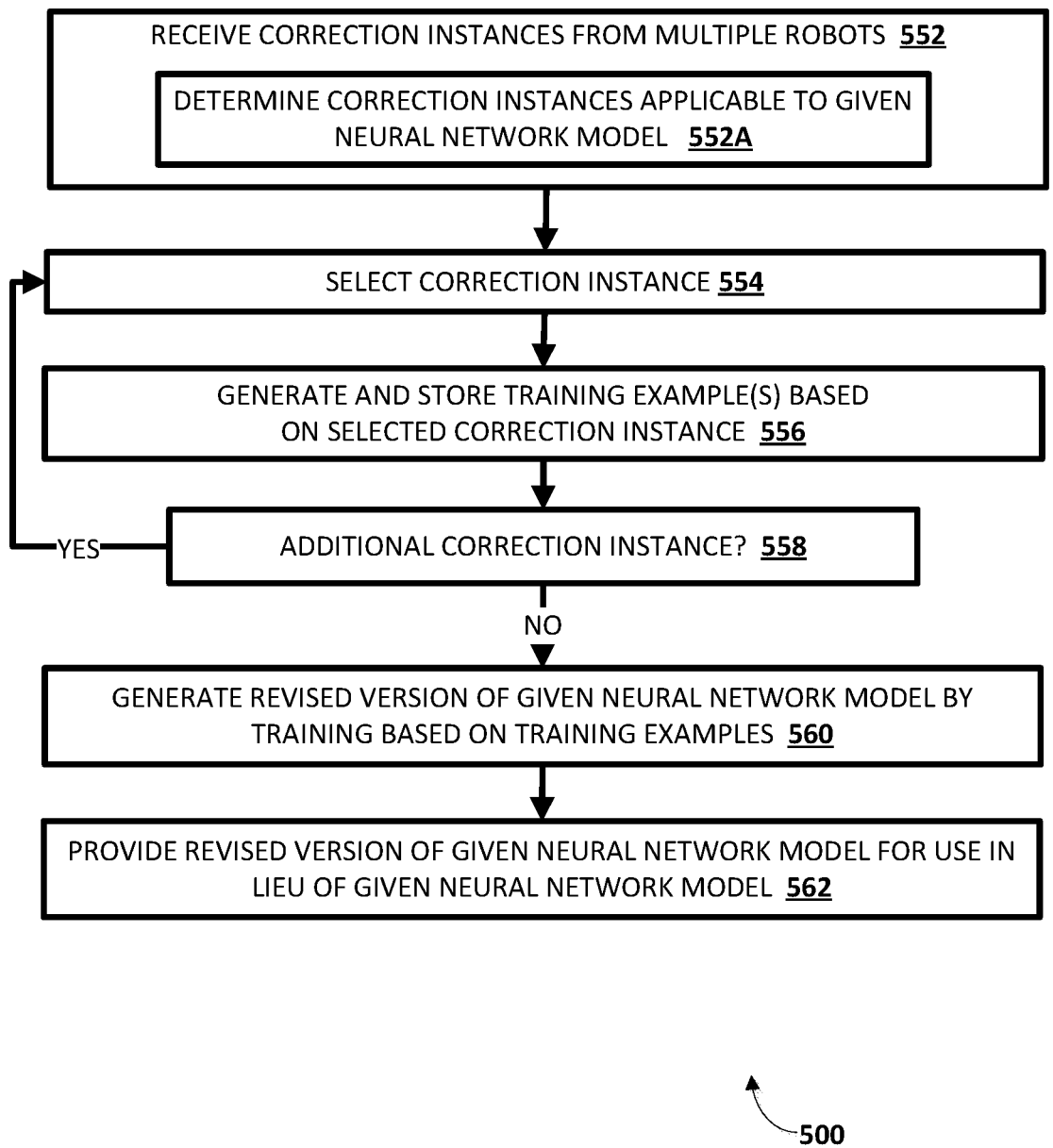
FIG. 5 is a flowchart illustrating yet another example method according to implementations disclosed herein.

Referring now to FIG. 5, yet another example method 500 according to various implementations is described. For convenience, the operations of the flowchart are described with reference to a system that performs the operations. This system may include various components of a robot and/or of one or more computing devices in communication with the robot. Moreover, while operations of method 500 are shown in a particular order, this is not meant to be limiting. One or more operations may be reordered, omitted or added.

Method 500 of FIG. 5 illustrates an example of generating a revised version of a neural network model based on correction instances, such as correction instances provided at block 364 (FIG. 3) and/or block 462 (FIG. 4).

At block 552, the system receives correction instances from multiple robots. In some implementations, the received correction instances are all applicable to the same given neural network model. For example, the received correction instances may all be applicable to a neural network model utilized in classification of objects.

In some other implementations, the correction instances received at block 552 may collectively be applicable to various neural network models. For example, some correction instances may be applicable to a "classification" neural network model, other correction instances may be applicable to a "grasping" neural network model, etc. In some of those implementations, block 552 includes sub-block 552A, in which the system determines correction instances that are applicable to a given neural network model. In other words, at block 552A, the system may determine, from a group of correction instances applicable to various neural network models, a sub-group that is applicable to the given neural network model. At block 552A, the system can determine the correction instances based on analysis of content of the correction instances. For example, the system can determine such correction instances based on the correction instances explicitly indicating the given neural network model (or a corresponding version). Also, for example, the system can determine such correction instances additionally or alternatively based on correction information included in such correction instances indicating the given model.

At block 554, the system selects a correction instance for the given neural network model.

At block 556, the system generates and stores one or more training examples based on the selected correction instance.

At block 558, the system determines if an additional correction instance is available for the given neural network model. If so, the system proceeds to block 554 and selects an additional correction instance, then proceeds again to block 556 and generates and stores additional training example(s) based on the selected additional correction instance. This may be iteratively performed, and may optionally be performed in parallel with block 560 (described below).

At block 560, the system generates a revised version of the given neural network model by training based on the training examples generated via iterations of block 556. For example, the system can start with the same version of the given neural network model that was utilized by the robots that provided the correction instances of block 552, a different version of the same model, or a different (but functionally similar) model. In some implementations, the system generates the revised version by training until one or more criteria are satisfied. The criteria can include, for example, use of all "current" training examples, at least a threshold quantity of training examples being utilized, at least a threshold duration of training being achieved, etc.

At block 562, the system provides the revised version of the given neural network model for use in lieu of the given neural network model.

Figure 6:
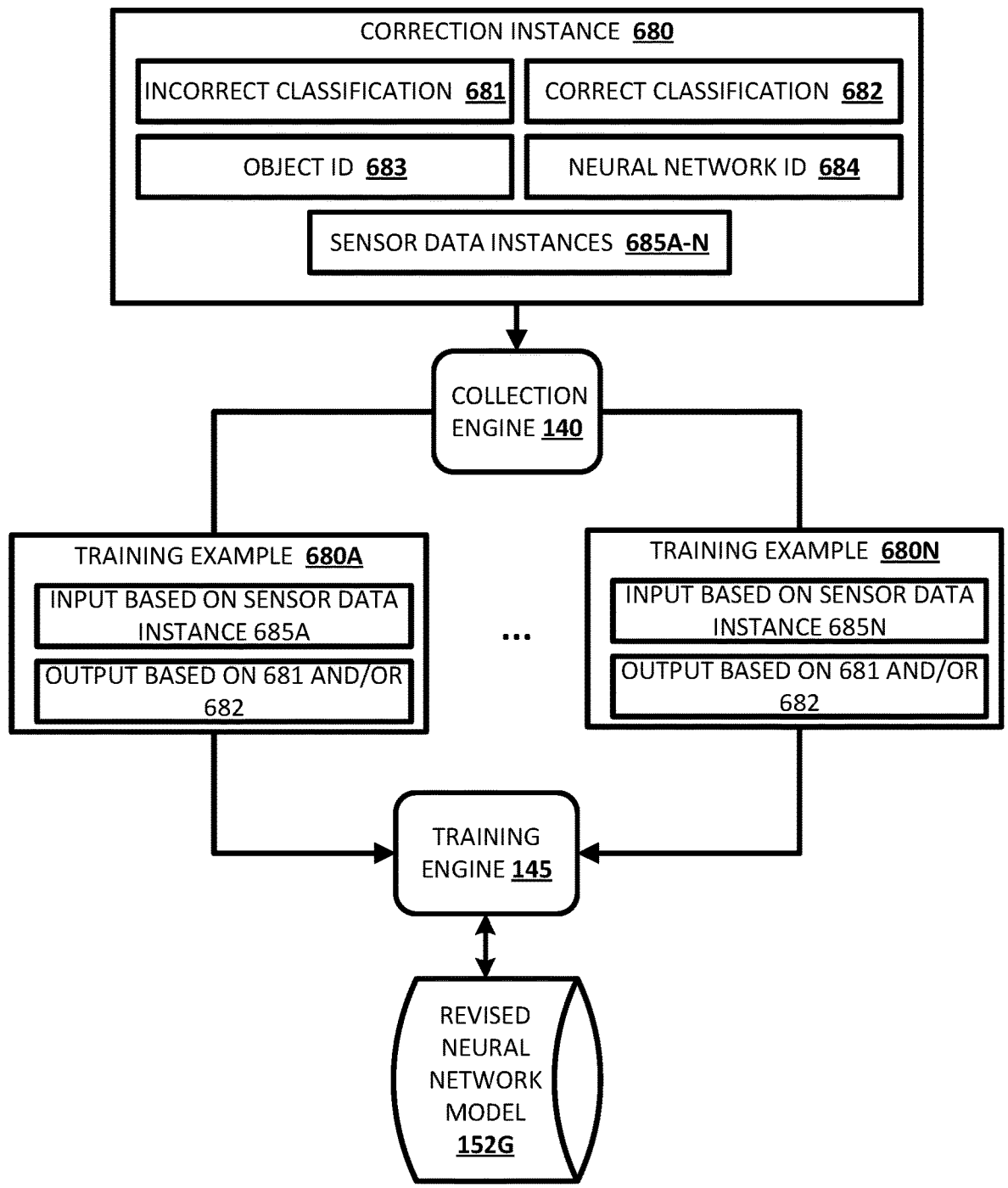
FIG. 6 illustrates an example of generating training examples based on a correction instance, and using the training examples to train a neural network model.

FIG. 6 illustrates an example of generating training examples 680A-680N based on a correction instance 680, and using the training examples to train a neural network model to generate a revised neural network model 151G.

The implementation of the correction instance 680 of FIG. 6 is based on a human correction of an incorrectly determined classification of an object. The correction instance 680 includes sensor data instances 685A-N. Each sensor data instance of instances 685A-N includes sensor data (e.g., vision sensor data, position sensor data) for a corresponding time.

Correction instance 680 also includes an incorrect classification indication 681, a correct classification indication 682, an object ID 683, and a neural network ID 684. The incorrect classification indication 681 can indicate an object classification for an object that was incorrectly determined by a corresponding parameters module using a corresponding neural network model. The correct classification indication 682 is an example of correction information that can be determined based on the human correction. For example, the correct classification indication 682 can be based on natural language user interface input of a human correction and indicates the correct classification for the incorrectly classified object. The object ID 683 identifies the object. For example, the object ID 683 may be pose(s) of the object and/or another unique identifier of the object. The neural network ID 684 indicates the neural network that was utilized in determining the incorrect classification of the object.

The collection engine 140 utilizes the correction instance 680 to generate a plurality of training examples 680A-680N. Training example 680A includes input based on sensor data instance 685A of the correction instance 680. For example, sensor data instance 685A can include a vision sensor data instance selected based on determining that the vision sensor data includes the object (e.g., based on determining it captures a pose indicated by the object ID 683). In other implementations, only vision sensor data instances that capture the object are provided in correction instance 680 (obviating the need of the collection engine to ensure the vision sensor data utilized in generating training example input includes the object). Training example 680A also includes training example output based on the incorrect classification indication 681 and/or the correct classification indication 682. For example, the training example output can indicate one or both of: that the incorrect classification indication 681 is not the correct classification for the object in the sensor data instance 685A; and that the correct classification indication 682 is the correct classification for the object in the sensor data instance 685A.

Training example 680N includes input based on sensor data instance 685N of the correction instance 680. For example, sensor data instance 685N can include a vision sensor data instance that is different from that of sensor data instance 685A. For instance, it may also capture the object, but may capture it from a different pose (i.e., the vision sensor was at a different pose relative to the object during capture). Training example 680N also includes training example output based on the incorrect classification indication 681 and/or the correct classification indication 682. For example, the training example output can indicate one or both of: that the incorrect classification indication 681 is not the correct classification for the object in the sensor data instance 685N; and that the correct classification indication 682 is the correct classification for the object in the sensor data instance 685N. Additional training examples can be generated based on the correction instance 680, as indicated by the ellipsis between training examples 680A and 680N.

The training engine 145 uses the training examples 680A-680N, and optionally additional training examples generated based on correction instances from other robots, to train a neural network model that corresponds to the neural network ID 684. Through such training, a revised neural network model 151G is generated, and can be provided for use in lieu of the neural network model of neural network ID 684.

Figure 7:
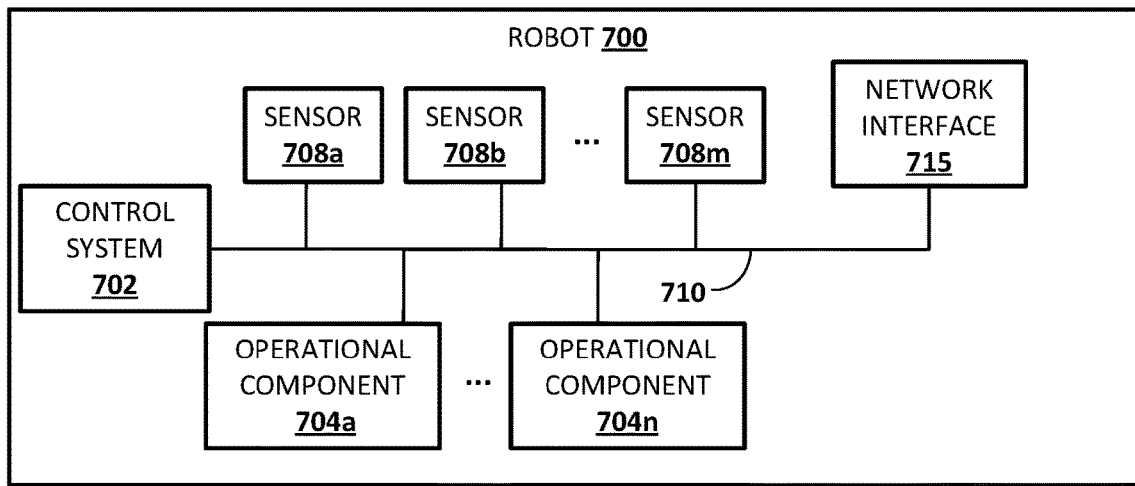
FIG. 7 schematically depicts an example architecture of a robot.

FIG. 7 schematically depicts an example architecture of a robot 700. Robot 190 and/or additional robots 192 of FIG. 1 may implement one or more components of the example architecture of FIG. 7. The robot 700 includes a robot control system 760, one or more operational components 704a-704n, and one or more sensors 708a-708m. The sensors 708a-708m may include, for example, vision sensors (e.g., camera(s), 3D scanners), light sensors, pressure sensors, pressure wave sensors (e.g., microphones), proximity sensors, accelerometers, gyroscopes, thermometers, barometers, and so forth. While sensors 708a-708m are depicted as being integral with robot 700, this is not meant to be limiting. In some implementations, sensors 708a-708m may be located external to robot 700, e.g., as standalone units.

Operational components 704a-704n may include, for example, one or more end effectors (e.g., grasping end effectors) and/or one or more servo motors or other actuators to effectuate movement of one or more components of the robot. For example, the robot 700 may have multiple degrees of freedom and each of the actuators may control actuation of the robot 700 within one or more of the degrees of freedom responsive to the control commands. As used herein, the term actuator encompasses a mechanical or electrical device that creates motion (e.g., a motor), in addition to any driver(s) that may be associated with the actuator and that translate received control commands into one or more signals for driving the actuator. Accordingly, providing a control command to an actuator may comprise providing the control command to a driver that translates the control command into appropriate signals for driving an electrical or mechanical device to create desired motion.

The control system 702 may be implemented in one or more processors, such as a CPU, GPU, and/or other controller(s) of the robot 700. In some implementations, the robot 700 may comprise a "brain box" that may include all or aspects of the control system 702. For example, the brain box may provide real time bursts of data to the operational components 704a-n, with each of the real time bursts comprising a set of one or more control commands that dictate, inter alia, the parameters of motion (if any) for each of one or more of the operational components 704a-n.

Although control system 702 is illustrated in FIG. 7 as an integral part of the robot 700, in some implementations, all or aspects of the control system 702 may be implemented in a component that is separate from, but in communication with, robot 700. For example, all or aspects of control system 702 may be implemented on one or more computing devices that are in wired and/or wireless communication with the robot 700, such as computing device 810.

In some implementations, the control system 702 functionally implements and/or interfaces with one or more of the components 103 of FIG. 1. For example, the control system 702 may implement the planning module 122, the commands module 123, the UI input module 124, the UI output module 125, the correction module 126, the correction instance engine 130, and/or the robot data engine 135. Also, for example, the control system 702 may interface with (e.g., via network interface 715) parameters modules 121A-N and/or NLP system 133. Additionally or alternatively, the control system 702 may implement one or more of the parameters modules 121A-N and may optionally store locally one or more of the neural network models 150A-N.

Figure 8:
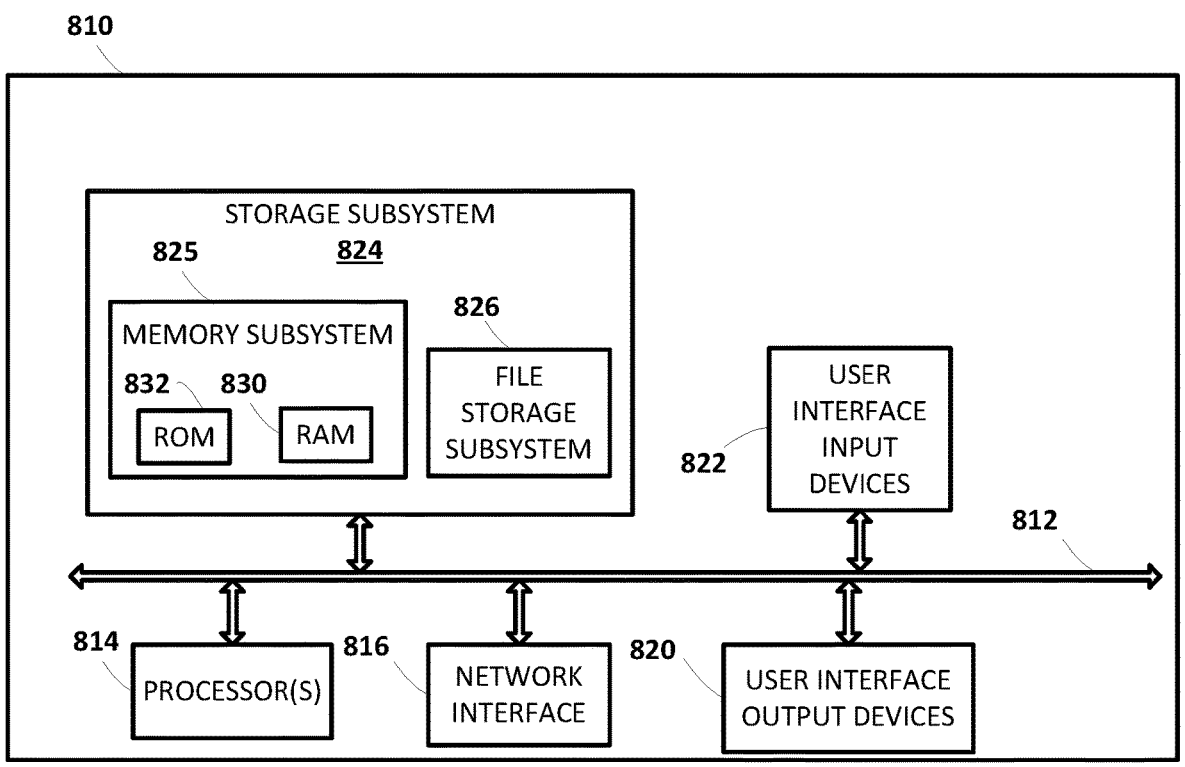
FIG. 8 schematically depicts an example architecture of a computer system.

FIG. 8 is a block diagram of an example computing device 810 that may optionally be utilized to perform one or more aspects of techniques described herein. Computing device 810 typically includes at least one processor 814 which communicates with a number of peripheral devices via bus subsystem 812. These peripheral devices may include a storage subsystem 824, including, for example, a memory subsystem 825 and a file storage subsystem 826, user interface output devices 820, user interface input devices 822, and a network interface subsystem 816. The input and output devices allow user interaction with computing device 810. Network interface subsystem 816 provides an interface to outside networks and is coupled to corresponding interface devices in other computing devices.

User interface input devices 822 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 810 or onto a communication network.

User interface output devices 820 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 810 to the user or to another machine or computing device.

Storage subsystem 824 stores programming and data constructs that provide the functionality of some or all of the modules described herein. For example, the storage subsystem 824 may include the logic to perform selected aspects of the methods described herein.

These software modules are generally executed by processor 814 alone or in combination with other processors. Memory 825 used in the storage subsystem 824 can include a number of memories including a main random access memory (RAM) 830 for storage of instructions and data during program execution and a read only memory (ROM) 832 in which fixed instructions are stored. A file storage subsystem 826 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 826 in the storage subsystem 824, or in other machines accessible by the processor(s) 814.

Bus subsystem 812 provides a mechanism for letting the various components and subsystems of computing device 810 communicate with each other as intended. Although bus subsystem 812 is shown schematically as a single bus, alternative implementations of the bus subsystem may use multiple busses.

Computing device 810 can be of varying types including a workstation, server, computing cluster, blade server, server farm, or any other data processing system or computing device. Due to the ever-changing nature of computers and networks, the description of computing device 810 depicted in FIG. 8 is intended only as a specific example for purposes of illustrating some implementations. Many other configurations of computing device 810 are possible having more or fewer components than the computing device depicted in FIG. 8.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented by one or more processors, comprising:
   applying sensor data as input to a current model for a robot, the sensor data generated based on one or more sensors of the robot;
   generating output over the current model based on the sensor data;
   determining, based on the generated output, one or more parameters for a robot action directed toward an object in an environment of the robot, wherein the one or more parameters indicate a classification of the object;
   receiving, during or after performance of the robot action by the robot based on the one or more parameters, user interface input that corrects the robot action;
   initiating performance of the robot action based on the one or more parameters for the robot action, and based on one or more additional parameters that are determined using one or more additional models, for the robot, that are disparate from the current model;
   in response to receiving the user interface input that corrects the robot action:
      generating a correction instance that includes:
         multiple instances of sensor data that are related to the robot action, and
      transmitting the correction instance to one or more remote computing devices via a network interface;
   receiving, subsequent to transmitting the correction instance, a revised version of the current model, wherein the revised version of the current model is trained based on:
      the correction instance, and
      additional correction instances from additional robots, the additional correction instances based on multiple instances of additional sensor data that are related to additional robot actions performed by each of the additional robots; and in response to receiving the revised version of the current model, using the revised version of the current model in lieu of the current model in determining additional parameters for an additional robot action of the robot.

2. The method of claim 1, wherein the multiple instances of the sensor data included in the correction instance include multiple instances of vision sensor data, and wherein generating the correction instance comprises:

including a first instance of the vision sensor data, in the correction instance, based on determining that the first instance captures the object at a first time from a first pose, and including a second instance of the vision sensor data, in the correction instance, based on determining that the second instance captures the object at a second time from a second pose.

3. The method of claim 2, wherein generating the correction instance comprises:

determining that the multiple instances of the vision sensor data are related to the robot action based on determining that the multiple instances include an identifier of the object.

4. The method of claim 2, wherein the multiple instances of the vision sensor data are included in the sensor data applied to the current model in determining the one or more parameters for the robot action.

5. The method of claim 1, wherein generating the correction instance comprises generating the correction instance to further include correction information that is based on the user interface input and that specifies an alternate classification for the object.

6. The method of claim 1, wherein generating the correction instance comprises generating the correction instance to further include:

an indication of the current model based on the current model being used in determining the one or more parameters for the robot action.

7. The method of claim 1, wherein generating the correction instance comprises generating the correction instance to further include:

the one or more parameters for the robot action.

8. The method of claim 1, wherein the user interface input is natural language input.

9. A method implemented by one or more processors, comprising:

receiving user interface input during movement of a robot to perform an action directed toward an object;

determining that the user interface input indicates a correction to the action directed toward the object;

in response to determining that the user interface input indicates the correction:

generating a correction instance that includes:

multiple instances of vision sensor data that each captures the object, the vision sensor data generated by a vision sensor of the robot, and the multiple instances including a first instance that captures the object at a first time from a first pose, and a second instance that captures the object at a second time from a second pose;

wherein the multiple instances of the vision sensor data are included in the correction instance based on determining that each of the multiple instances captures the object; and transmitting the correction instance to one or more remote computing devices via a network interface, wherein the one or more remote computing devices use the correction instance to generate a plurality of training examples for training a model.

10. The method of claim 9, wherein the model is a neural network model and further comprising:

receiving, via the network interface, the neural network model after the neural network model is trained based on:

the plurality of training examples, and
additional training examples from additional correction instances from additional robots.

11. The method of claim 9, wherein the correction instance further includes correction information that is based on the user interface input.

12. The method of claim 9, further comprising:

determining a predicted classification of the object based on a local model that is local to the robot, wherein the action performed by the robot is performed based on the predicted classification;

wherein generating the correction instance includes generating the correction instance to further include the predicted classification of the object.

13. The method of claim 12, further comprising:

generating the plurality of training examples, wherein the training examples include negative training examples that include training example output that indicates the predicted classification is not a correct classification.

14. The method of claim 9, further comprising:

receiving initial user interface input;
determining that the initial user interface input indicates the object; and generating robot control commands to perform the action directed toward the object in response to determining that the initial user interface input indicates the object.

15. The method of claim 14, wherein the correction instance further includes correction information that is based on the initial user interface input.

16. The method of claim 9, further comprising, in response to determining that the user interface input indicates the correction:

providing user interface output that requests additional correction details;

receiving, in response to the providing, further user interface input that includes the additional correction details; and including the additional correction details in the correction instance.

17. The method of claim 9, further comprising, in response to determining that the user interface input indicates the correction:

adjusting, based on the user interface input, a locally stored parameter associated with the object.

18. A method implemented by one or more processors, comprising:

determining a classification of an object in an environment of a robot;

receiving initial user interface input provided by a user;
determining that the initial user interface input conforms to the classification of the object;

in response to determining that the initial user interface input conforms to the classification of the object:

providing control commands to one or more actuators of the robot to perform an action directed toward the object;

receiving additional user interface input during performance of the action directed toward the object;

determining that the additional user interface input indicates a conflicting classification of the object that does not conform to the determined classification of the object;

in response to determining that the additional user interface input indicates a conflicting classification of the object:

generating a correction instance that includes the conflicting classification indicated by the additional user interface input, and transmitting the correction instance to one or more remote computing devices via a network interface, wherein the one or more remote computing devices use the correction instance to generate a plurality of training examples for training a model.

19. The method of claim 18, wherein the correction instance includes at least one instance of vision sensor data that captures the object, the vision sensor data generated by a vision sensor of the robot.

20. The method of claim 18, wherein the correction instance includes multiple instances of vision sensor data that each captures the object, the vision sensor data generated by a vision sensor of the robot, and the multiple instances including a first instance that captures the object at a first time from a first pose, and a second instance that captures the object at a second time from a second pose.

* * * * *